(No Model.)

I. E. PALMER.
HAMMOCK SPREADER.

No. 469,869. Patented Mar. 1, 1892.

Witnesses:—
O. H. Nayrork
C. T. Sundgren

Inventor:—
Isaac E. Palmer
by attorneys
Brown & Swank

UNITED STATES PATENT OFFICE.

ISAAC E. PALMER, OF MIDDLETOWN, CONNECTICUT.

HAMMOCK-SPREADER.

SPECIFICATION forming part of Letters Patent No. 469,869, dated March 1, 1892.

Application filed December 4, 1891. Serial No. 413,987. (No model.)

*To all whom it may concern:*

Be it known that I, ISAAC E. PALMER, of Middletown, in the county of Middlesex and State of Connecticut, have invented a new and useful Improvement in Hammock-Spreaders, of which the following is a specification.

My invention relates to an improvement in hammock-spreaders in which provision is made for applying the spreader after the hammock has been strung.

A practical embodiment of my invention is represented in the accompanying drawings, in which—

Figure 1:
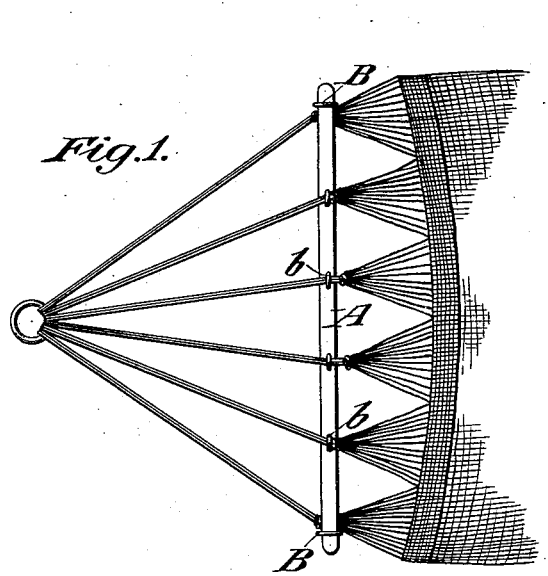
Figure 2:
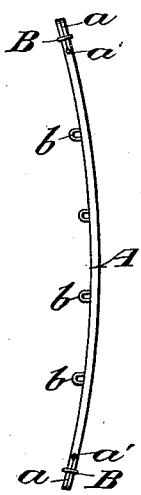
Figure 3:
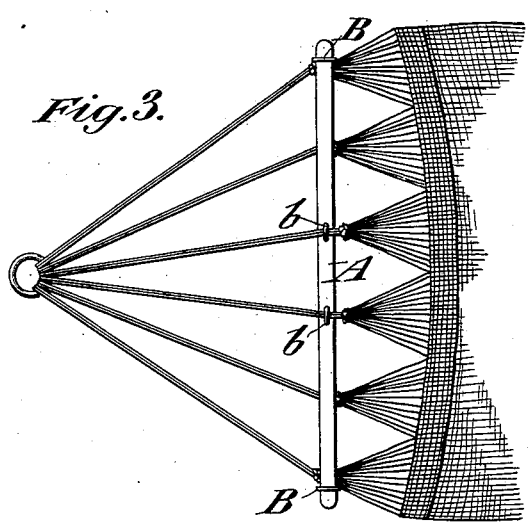
Figure 4:
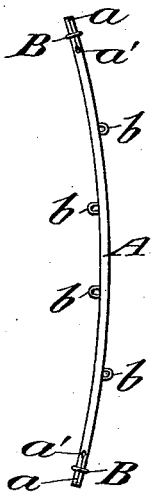

Figure 1 is a view of the spreader as it appears when adjusted to the hammock. Fig. 2 is an edge view of the spreader in detail. Fig. 3 represents a spreader of the same general structure applied to a hammock, provision being made in this form for passing some of the suspension-cords below and some above the spreader; and Fig. 4 represents an edge view in detail of the spreader shown in Fig. 3.

The body of the spreader is represented by A and is preferably of curved form, as clearly indicated in Fig. 2.

Provision is made for securing the outer suspension-cords of the hammock to the ends of the spreader by slitting the ends of the spreader, as indicated at $a$, and forming a more or less enlarged opening or slit $a'$ at the inner end of the slit $a$ in which the suspension-cord or the group of suspension-loops to which the suspension-cord is attached is adapted to rest. The slit ends of the spreader A are held tightly closed by a suitable fastening—such, for example, as a wire loop B slipped over the end—or the loop B might be compressed about the end. Openings for the passage of the suspension-cords intermediate of the outer suspension-cords are formed by staples $b$, and their points may be extended through the body of the spreader and be clinched upon the opposite side. In the forms shown in Figs. 1 and 2 I have represented the staples as located on one side of the spreader only, while in Figs. 3 and 4 I have represented some upon one side and some on the other.

To adjust the spreader to the hammock the outer suspension-cords, or the suspension-loops adjacent to the point of attachment of the suspension-cords, are passed into the open slits $a$ in the end of the spreader, and the latter are then sprung together and fastened, tightly gripping the cords or loops and holding them securely in position, separated the desired distance apart. The intermediate suspension-cords are then secured to the spreader by inserting them within the staples and securing the staples to the body of the spreader. It is desirable in general that the suspension-cords intermediate of the ends of the spreader should be allowed to render freely through their fastenings in order to permit the body of the hammock to adjust itself to the occupant.

The spreader as thus constructed may be furnished at a very slight cost, and may be readily applied to the hammock by those unskilled in the art and at the same time is effective in holding the hammock in the desired shape.

What I claim is—

The hammock-spreader having its ends slit for the reception of the outer suspension cords or loops, fastening devices for holding the slit ends of the spreader compressed, and devices intermediate of the ends of the spreader for securing the intermediate suspension-cords to the spreader, substantially as set forth.

ISAAC E. PALMER.

Witnesses:
FRANK HARVEY FIELD,
GEORGE BARRY.